(No Model.)
E. C. TECKTONIUS
SPLIT PULLEY.
No. 393,936. Patented Dec. 4, 1888.
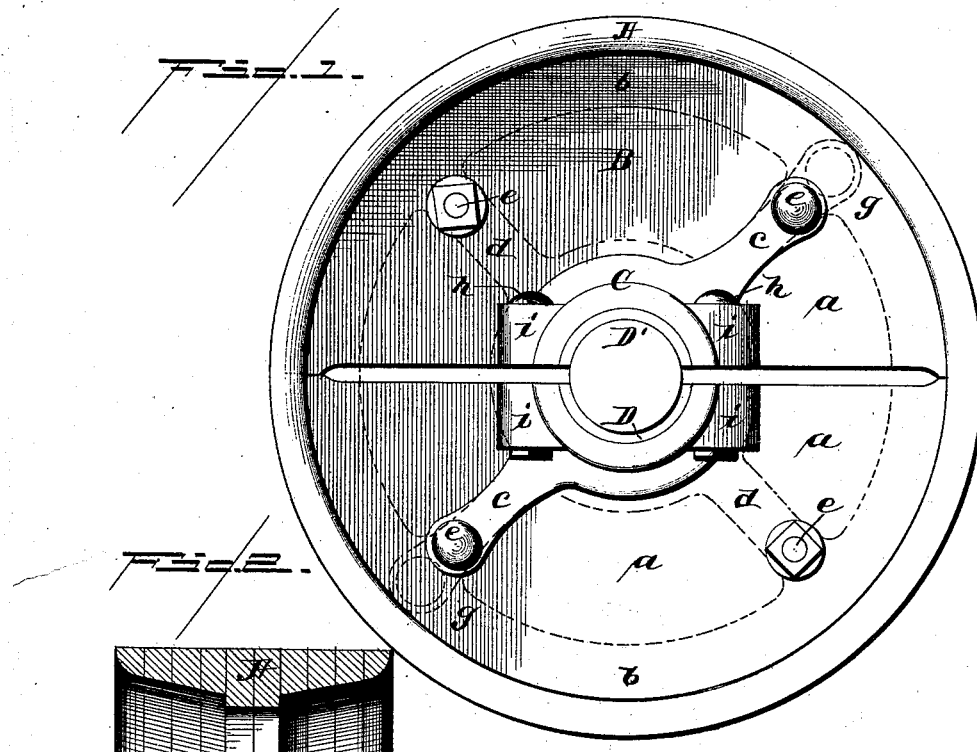
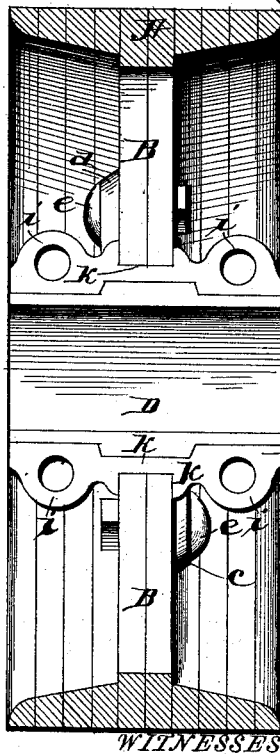
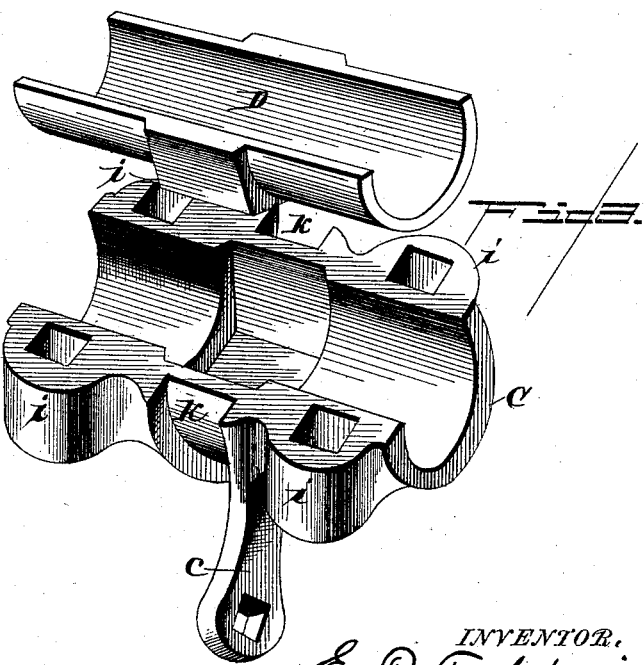
WITNESSES.　　　　　　　　　INVENTOR.
　　　　　　　　　　　　　　E. C. Tecktonius
　　　　　　　　　　　By Johnston, Reindl & Dyre
　　　　　　　　　　　　　　　Attorneys.

UNITED STATES PATENT OFFICE.

EMIL C. TECKTONIUS, OF RACINE, WISCONSIN.

SPLIT PULLEY.

SPECIFICATION forming part of Letters Patent No. 393,936, dated December 4, 1888.

Application filed September 3, 1888. Serial No. 284,432. (No model.)

*To all whom it may concern:*

Be it known that I, EMIL C. TECKTONIUS, a citizen of the United States, residing at Racine, in the county of Racine and State of Wisconsin, have invented certain new and useful Improvements in Split Pulleys; and I do hereby declare the following to be a full, clear, and exact description of the invention, such as will enable others skilled in the art to which it appertains to make and use the same.

My invention relates to pulleys, and has special reference to that class which are known as "split pulleys," provided with a wooden rim and a metallic hub.

The invention will be hereinafter described, and particularly pointed out in the claims.

In the accompanying drawings, which form a part of this specification, Figure 1 is a side elevation of a pulley, showing a skeleton web and the arms of the hub extending to a narrow web on the inside of the rim in dotted lines. Fig. 2 is a horizontal section through the pulley, and Fig. 3 is a detail perspective of one-half of the hub and its bushing or lining.

Reference being had to the drawings and the letters marked thereon, A indicates the rim of the pulley, which is made of wood, and is formed of a series of segments of a circle properly secured together. B is the web of the pulley, and it may be made to fill the space between the inner walls of the rim A, or it may be in the form of a skeleton, as shown at $a$ in Fig. 1, or it may be provided only with a narrow rim, as $b$, (shown in said figure.)

C indicates the hub, which is made of metal, and is provided with radial arms $c$ on both sides of the longitudinal center of the hub for attachment to opposite sides of the web. These arms are made to project from the hub at different points of its circumference, as shown in Fig. 1, in which the letter $c$ indicates the arms on one side of the longitudinal center, and $d$ the arms on the opposite side of said center and the web of the pulley. By thus disposing the arms of the hub the metal is equally distributed on the pulley and the weight thereof reduced to the minimum, while the bolts $e$ for securing the hub to the pulley are placed at a distance from the center of the pulley, where they are capable of resisting greater strain than when placed near the shaft.

In the construction of large pulleys it may be desirable to omit the full web B. In such instances I provide a narrow rim, $b$, and extend the arms of the hub so as to engage with opposite sides of said rim, as shown at $g$ in dotted lines in Fig. 1. The number of arms may be increased according to the necessities growing out of the diameter of the pulley.

The two parts of the pulleys are secured together upon a shaft by bolts $h$, which pass through the lugs $i$ on the half-hub, and each half-hub is provided with a half bushing or lining, D.

To adapt the hub to different sizes of shafting, the linings are made of different bores, so that the pulley may be applied to shafts of different diameters within a reasonable range or limit. The hub is also provided with a groove, $k$, which corresponds in width to the thickness of the web of the pulley and engages therewith, thus affording additional bearing-surface to the hub with the pulley, and providing additional means for securing the hub against displacement under heavy strains. This groove is applicable in the construction having a full or solid web, or in that in which a skeleton web is used. When the narrow web is used, the groove in the hub may be dispensed with.

Having thus fully described my invention, what I claim is—

1. A hub for a split pulley made in two sections, each section having a radial arm on opposite sides of the longitudinal center of the hub, and each arm constructed to be detachably secured at its outer end to the pulley on opposite sides thereof, substantially as described.

2. In a split pulley, a divided metallic hub, each section of which has a radial arm on opposite sides of the pulley, in combination with a rim having a web to which the arms of the pulley are secured, substantially as described.

3. In a split pulley, a metallic hub having a groove in its outer surface and radial arms on both sides of its longitudinal center, in combination with a web with which said groove engages and to which the arms are secured, substantially as described.

4. In a split pulley, a divided metallic hub, each section of which is provided with a radial arm on opposite sides of the pulley, in combination with a rim having a web to which the arms of the pulley are secured, and a lining or bushing to form a bearing on a shaft, substantially as described.

In testimony whereof I affix my signature in presence of two witnesses.

EMIL C. TECKTONIUS.

Witnesses:
ERASTUS C. PECK,
ALBERT L. ANDERSON.